United States Patent [19]

Lee et al.

[11] Patent Number: 5,547,617
[45] Date of Patent: Aug. 20, 1996

[54] APPARATUS FOR INCREASING EFFECTIVE ACTIVE AREA

[75] Inventors: Adam T. Lee, Richardson; Kuang Wu, Plano; Larry Burton, De Soto, all of Tex.

[73] Assignee: Glitsch, Inc., Dallas, Tex.

[21] Appl. No.: 414,792

[22] Filed: Mar. 31, 1995

[51] Int. Cl.$^6$ .................................................. B01F 3/04
[52] U.S. Cl. .................................. 261/114.5; 261/114.1; 261/114.4
[58] Field of Search ........................... 261/114.5, 114.4, 261/114.1

[56] References Cited

U.S. PATENT DOCUMENTS

| | | | |
|---|---|---|---|
| 2,582,657 | 1/1952 | Semer | 261/114.5 |
| 2,582,826 | 1/1952 | Glitsch | 189/34 |
| 2,611,596 | 9/1952 | Glitsch | 261/114 |
| 2,693,949 | 11/1954 | Huggins | 261/114 |
| 2,757,915 | 8/1956 | Huggins | 261/114 |
| 2,762,692 | 9/1956 | Spitz et al. | 23/283 |
| 2,787,453 | 4/1957 | Hibshman et al. | 261/114 |
| 2,836,406 | 5/1958 | Nutter | 261/114.1 |
| 2,951,691 | 9/1960 | Nutter | 261/114 |
| 3,008,553 | 11/1961 | Glitsch et al. | 189/36 |
| 3,013,782 | 12/1961 | Glitsch | 261/114 |
| 3,079,134 | 2/1963 | Winn | 261/113 |
| 3,080,155 | 3/1963 | Glitsch et al. | 261/114 |
| 3,087,711 | 4/1963 | Glitsch | 261/114 |
| 3,125,614 | 3/1964 | Mayfield et al. | 261/114 |
| 3,233,708 | 2/1966 | Glitsch | 189/36 |
| 3,282,576 | 11/1966 | Bruckert et al. | 261/114 |
| 3,343,821 | 9/1967 | Winn et al. | 261/112 |
| 3,410,540 | 11/1968 | Bruckert | 261/113 |
| 3,464,679 | 9/1969 | Becker | 261/114 |
| 3,467,365 | 9/1969 | Webster | 261/114 |
| 3,550,916 | 12/1970 | Hoppe et al. | 261/114 |
| 3,784,175 | 1/1974 | Hirao et al. | 261/114 |
| 3,959,419 | 5/1976 | Kitterman | 261/98 |
| 3,969,447 | 7/1976 | Glitsch et al. | 261/111 |
| 4,101,610 | 7/1978 | Kirkpatrick et al. | 261/110 |
| 4,120,919 | 10/1978 | McClain | 261/114.5 |
| 4,123,008 | 10/1978 | McClain | 239/568 |
| 4,133,852 | 1/1979 | Di Nicolantonio et al. | 261/114.5 |
| 4,159,291 | 6/1979 | Bruckert et al. | 261/114.1 |
| 4,174,363 | 11/1979 | Bruckert | 261/114.5 |
| 4,275,021 | 6/1981 | Kirkpatrick et al. | 261/114 JP |
| 4,499,035 | 2/1985 | Kirkpatrick et al. | 261/114 JP |
| 4,504,426 | 3/1985 | Chuang et al. | 261/114 R |
| 4,543,219 | 9/1985 | Yamato et al. | 261/109 |
| 4,550,000 | 10/1985 | Bentham | 261/114 R |
| 4,597,916 | 7/1986 | Chen | 261/94 |
| 4,601,788 | 7/1986 | Bannon | 202/153 |
| 4,603,022 | 7/1986 | Yoneda et al. | 261/114 R |
| 4,604,247 | 8/1986 | Chen et al. | 261/94 |
| 4,623,493 | 11/1986 | Bentham | 261/109 |

(List continued on next page.)

FOREIGN PATENT DOCUMENTS

| | | |
|---|---|---|
| 510247 | 4/1976 | U.S.S.R. . |
| 997706 | 2/1983 | U.S.S.R. . |
| 2092175 | 8/1982 | United Kingdom . |

OTHER PUBLICATIONS

Chen, Gilbert K., "Packed Column Intervals", *Chemical Engineering*, Mar. 5, 1984, pp. 40–51.
Union Carbide Corporation, "Linde Multiple Downcomer Trays".
*Ballast Tray Design Manual*, Glitsch, Inc., Bulletin No. 4900, Fourth Edition, pp. 32–33.
*Ballast Tray Design Manual*, Glitsch, Inc., Bulletin No. 4900, Fourth Edition.

*Primary Examiner*—Tim R. Miles
*Attorney, Agent, or Firm*—Jenkens & Gilchrist, P.C.

[57] ABSTRACT

A downcomer-tray assembly for vapor liquid contact towers with enlarged effective active areas. The downcomers are constructed with support baffles enabling intermediate areas of the downcomer-tray to be supported therefrom and outer areas of the downcomer-tray to be supported by an active tower support ring. An active bridge may be used between end-to-end downcomers for maximizing the active area of the associated tray.

26 Claims, 4 Drawing Sheets

U.S. PATENT DOCUMENTS

| | | | |
|---|---|---|---|
| 4,627,941 | 12/1986 | Bentham | 261/109 |
| 4,729,857 | 3/1988 | Lee et al. | 261/97 |
| 4,820,456 | 4/1989 | Kiselev | 261/111 |
| 4,838,906 | 6/1989 | Kiselev | 55/238 |
| 4,842,778 | 6/1989 | Chen et al. | 261/97 |
| 4,908,051 | 3/1990 | Kiselev | 55/457 |
| 4,909,967 | 3/1990 | Binkley et al. | 261/97 |
| 4,956,127 | 9/1990 | Binkley et al. | 261/114.1 |
| 5,047,179 | 9/1991 | Nye | 261/114.1 |
| 5,049,319 | 9/1991 | Nye | 261/114.1 |
| 5,098,615 | 3/1992 | Resetarits | 261/114.1 |
| 5,164,125 | 11/1992 | Binkley et al. | 261/114.1 |
| 5,192,466 | 3/1993 | Binkley | 261/114.3 |
| 5,223,183 | 6/1993 | Monkelbaan et al. | 261/114.1 |
| 5,244,604 | 9/1993 | Miller et al. | 261/97 |
| 5,318,732 | 6/1994 | Monkelbaan et al. | 261/114.1 |
| 5,454,989 | 10/1995 | Nutter | 261/114.5 |

# 5,547,617

APPARATUS FOR INCREASING EFFECTIVE ACTIVE AREA

BACKGROUND OF THE INVENTION

1. Field of The Invention

The present invention pertains to gas-liquid contacting towers and, more particularly, to an improved downcomer-tray assembly incorporating an active bridge between adjacent downcomers, an active support ring within the tower, and active washers secured thereto for increasing the effective active area of the tray.

2. History of the Prior Art

Distillation columns are utilized to separate selected components from a multicomponent stream. Generally, such gas-liquid contact columns utilize either trays, packing or combinations of each. In recent years the trend has been to replace the so-called "bubble caps" by sieve and valve trays in most tray column designs. Additionally, random (dumped) or structured packings have been utilized in combination with the trays in order to effect improved separation of the components in the stream.

Successful fractionation in the column is dependent upon intimate contact between liquid and vapor phases. Some vapor and liquid contact devices, such as trays, are characterized by relatively high pressure drop and relatively high liquid hold-up. Another type of vapor and liquid contact apparatus, namely structured high efficiency packing, has also become popular for certain applications. Such packing is energy efficient because it has low pressure drop and low liquid hold-up. However, these very properties at times make columns equipped with structured packing difficult to operate in a stable, consistent manner. Moreover, many applications simply require the use of trays.

Fractionation column trays generally come in one of two configurations: cross-flow and counter flow. The trays generally consist of a solid tray or deck having a plurality of apertures and are installed on support rings within the tower. In cross-flow trays, vapor ascends through the apertures and contacts the liquid moving across the tray; through the "active" area thereof. In the active area, liquid and vapor mix and fractionation occurs. The liquid is directed onto the tray by means of a vertical channel from the tray above. This channel is referred to as the Inlet Downcomer. The liquid moves across the tray and exits through a similar channel referred to as the Exit Downcomer. The location of the downcomers determine the flow pattern of the liquid. If there are two Inlet Downcomers and the liquid is split into two streams over each tray, it is called a two pass tray. If there is only one Inlet and one Outlet Downcomer on opposite sides of the tray, it is called a single pass tray. For two or more passes, the tray is often referred to as a Multipass Tray. The number of passes generally increases as the required (design) liquid rate increases. It is the active area of the tray, however, which is of critical concern.

Not all areas of a tray are active for vapor-liquid contact. For example, the areas along the perimeter of the tray and under the Inlet Downcomer are generally solid regions. To attempt to gain more area of the tray for vapor/liquid contact, downcomers are often sloped. The maximum vapor/liquid handling capacity of the tray generally increases with an increase in the active or Bubbling Area. There is, however, a limit as to how far one can slope the downcomer(s) in order to increase the Bubbling Area; otherwise the channel will become too small. This can restrict the flow of the liquid and/or restrict the disengagement of vapor retained in the liquid, cause liquid to back up in the downcomer, and thus prematurely limit the normal maximum vapor/liquid handling capacity of the tray.

A variation for increasing the Bubbling Area and hence vapor/liquid handling capacity is a multiple downcomer tray. There are usually many box shaped vertical channels installed in a symmetrical pattern across the tray to direct liquid onto and off of the tray. The downcomers do not extend all the way to the tray below but stop short of the tray by a predetermined distance which is limited by a sufficient space to permit disengagement of any vapor retained in the liquid entering the Exit Downcomer. The downcomer pattern may be rotated 90 or 180 degrees between successive trays. The bottom of the boxes is solid except for slots that direct the liquid onto the tray below. Such trays fall into the category of Multipass Trays which are usually used for high liquid rates. A critical feature in such trays is the available active area of the tray. Designs for increasing this active area are thus of major import in tray fabrication.

Various techniques have been developed for increasing the tray active area in process column designs. For example, U.S. Pat. No. 4,956,127, assigned to the assignee of the present invention, illustrates a tray design with a raised active area disposed beneath the downcomer inlet for increasing the active area of the tray. U.S. Pat. No. 5,164,125, also assigned to the assignee of the present invention, again addresses a downcomer-tray assembly for vapor liquid contact towers featuring improved downcomer and tray designs for enhancing the active area of the tray as well as the balance of liquid flow thereon. The balance of liquid flow is of primary significance in such trays. As set forth in U.S. Pat. No. 5,192,466, also assigned to the assignee of the present invention, methods of and apparatus for flow promotion and effective balance of flow upon a tray is an important design feature. When flow is uneven or stagnated, the efficiency of the chemical process column is drastically reduced. For this reason, these and other innovations in the downcomer-tray area have received considerable attention.

In addition to the above, the technology of gas-liquid contact addresses many other performance issues. Examples are seen in several prior art patents, which include U.S. Pat. No. 3,959,419, 4,604,247 and 4,597,916, each assigned to the assignee of the present invention and U.S. Pat. No. 4,603,022 issued to Mitsubishi Jukogyo Kabushiki Kaisha of Tokyo, Japan. A particularly relevant reference is seen in U.S. Pat. No. 4,499,035 assigned to Union Carbide Corporation that teaches a gas-liquid contacting tray with improved inlet bubbling means. A cross-flow tray of the type described above is therein shown with improved means for initiating bubble activity at the tray inlet comprising spaced apart, imperforate wall members extending substantially vertically upwardly and transverse to the liquid flow path. The structural configuration is said to promote activity over a larger tray surface than that afforded by simple perforated tray assemblies. This is accomplished in part by providing a raised region adjacent the downcomer area for facilitating vapor ascension therethrough.

U.S. Pat. No. 4,550,000 assigned to Shell Oil Company teaches apparatus for contacting a liquid with a gas in a relationship between vertically stacked trays in a tower. The apertures in a given tray are provided for the passage of gas in a manner less hampered by liquid coming from a discharge means of the next upper tray. This is provided by perforated housings mounted to the top of the tray deck beneath the downcomers for breaking up the descending liquid flow. Such advances improve tray efficiency within the confines of prior art structures. Likewise, U.S. Pat. No.

4,543,219 assigned to Nippon Kayaku Kabushiki Kaisha of Tokyo, Japan teaches a baffle tray tower. The operational parameters of high gas-liquid contact efficiency and the need for low pressure loss are set forth. Such references are useful in illustrating the need for high efficiency vapor liquid contact in tray process towers. U.S. Pat. No. 4,504,426 issued to Carl T. Chuang et. al. and assigned to Atomic Energy of Canada Limited is yet another example of gas-liquid contacting apparatus. This reference likewise teaches the multitude of advantages in improving efficiency in fractionation and modifications in downcomer-tray designs. The perforated area of the tray is extended beneath the downcomer with between 0 to 25% less perforation area.

Yet another reference is seen in U.S. Pat. No. 3,410,540 issued to W. Bruckert in 1968. A downcomer outlet baffle is therein shown to control the discharge of liquid therefrom. The baffle may include either a static seal or dynamic seal. In this regard the openings from the downcomer are sufficiently small to control discharge and may be larger than the tray perforations and of circular or rectangular shape. The transient forces which may disrupt the operation of a downcomer are also more fully elaborated therein. These forces and related vapor-liquid flow problems must be considered for each application in which a downcomer feeds an underlying tray.

Yet a further reference addressing downcomer tray assemblies and methods of mixing vapor with liquid from a discharge area of a downcomer is set forth and shown in U.S. Pat. No. 4,956,127 (the '127 Patent) assigned to the assignee of the present invention. In the '127 Patent, a raised active inlet area as set forth and shown, which inlet area is provided for the venting of vapor from the tray therebeneath. The raised inlet area reduces fluid pressure of the vapor to facilitate the flow of ascending vapor therethrough. A series of louvers disposed on the raised active inlet area selectively directs the upward flow of vapor into the liquid region below the downcomer to generate more efficient vapor liquid contact and reduced back mixing across the tray. The discharge of liquid from the downcomer onto the raised active inlet area, though effective, has been shown to result in weeping as the discharged liquid from the downcomer passes through the apertures of the active inlet area. Additionally, the liquid splashing outwardly from the downcomer increases the frothiness thereof and causes liquid drops to be more easily suspended.

As set forth above, the effectiveness of downcomer-tray operation is directly related to fluid flow configurations. When downcomer weirs and other structural aspects of the tray inhibit either vapor or liquid flow, tower efficiency is reduced. In multiple downcomer tray assemblies, the tray decks are literally divided by the downcomer. This tray division can result in unequal flow on opposite sides of the downcomer. Likewise, structural members, such as support beams disposed under tray areas, can interfere with ascending vapor flow. Other structural members such as tray hold down and securement devices often disposed on tray perimeters may likewise present solid, non-active tray areas which prevent vapor flow. Such inactive, solid areas reduce tray efficiency as described above. It would be an advantage therefore to provide a tray assembly addressing the problems of both liquid and vapor flow uniformity in a configuration which maximizes the active area of the tray and simplifies certain structural aspects therein to maximize the efficiency.

Such a downcomer-tray assembly is provided by the present invention wherein a perforated column support ring and perforated washers are secured along the tray perimeter to increase the active area of the tray. Additionally, a structural baffle system may be used to support the downcomers, positioning them above a tray area incorporating venting chambers upstanding on the tray deck therebelow and active "bridges" therebetween. The absence of structural support beams beneath the tray deck in conjunction with the active bridges and tray perimeter improve the efficiency of the column. The baffle support may be further constructed in multiple downcomer configurations to permit liquid flow thereacross for flow equalization upon the tray.

SUMMARY OF THE INVENTION

The present invention pertains to downcomer tray assemblies for chemical process columns. More particularly, one aspect of the invention includes a downcomer-tray assembly for a process column of the type wherein liquid flows downwardly from a first tray through a first downcomer onto a second tray and across the active areas thereof. Across these active tray areas vapor flows upwardly for interaction and mass transfer with the liquid. The liquid then passes from the second tray through another downcomer. The present invention comprises an active support ring underlying the perimeter of the trays and an active washer in securement thereto. In another aspect of the invention, baffles are connected to the downcomers for the support thereof by a plurality of angulated support members secured one end to the baffle and at a second end to the tray-downcomer region.

In another aspect, the invention relates to a multiple downcomer tray assembly for a chemical process column of the type wherein liquid flows downwardly and vapor flows upwardly in interaction therewith and wherein liquid flows upon a first tray and downwardly from the first tray through a first series of downcomers disposed therein onto a second tray and thereupon adjacent a second series of downcomers disposed therein. The invention comprises an active support ring around the perimeter of the trays for the outward support thereof and a plurality of support baffles extending along at least some of the downcomers for the intermediate support thereof. A plurality of mounting members secure the downcomers to the support baffles and at least two downcomers are disposed in spaced, end to end relationship within one of the trays facilitating an active tray bridge section disposed between the ends thereof. This construction permits ascending vapor flow through the bridge, which in conjunction with the active support ring increases the tray active area.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION OF THE PREFERRED EMBODIMENT

Figure 1:
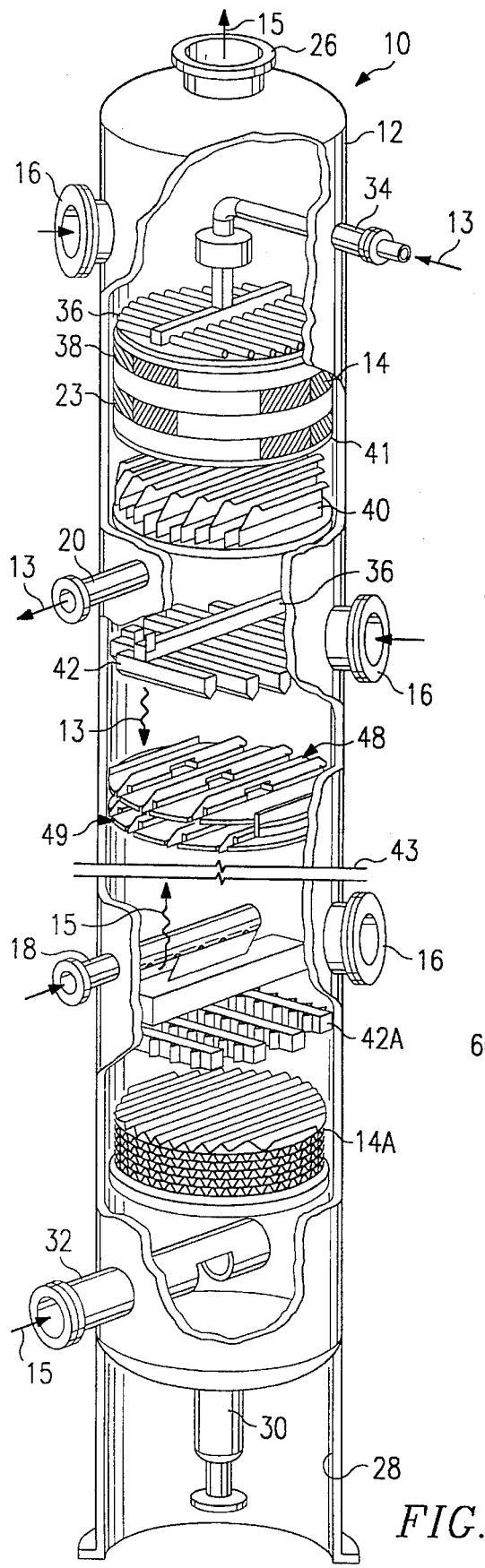
FIG. 1 is a perspective view of a packed column with various sections cut away for illustrating a variety of tower internals and one embodiment of a downcomer tray assembly constructed in accordance with the principles of the present invention disposed therein.

Referring first to FIG. 1, there is shown a fragmentary, perspective view of an illustrative packed exchange tower or column with various sections cut away for showing a variety of tower internals and the utilization of one embodiment of the tray assembly of the present invention. The exchange column 10 of FIG. 1 comprises a cylindrical tower 12 having a plurality of packing bed layers 14 and trays disposed therein. A plurality of manways 16 are likewise constructed for facilitating access to the internal region of the tower 12. Also provided are side stream draw off line 20, liquid side feed line 18, and side stream vapor feed line or reboiler return line 32. A reflux return line 34 is provided atop the column 10.

In operation, liquid 13 is fed into the column 10 through reflux return line 34 and side stream feed input line 18. The liquid 13 flows downwardly through the tower and ultimately leaves the tower either at side stream draw off 20, or at bottom stream draw off line 30. In its downward flow, the liquid 13 is depleted of some material which evaporates from it as it passes through the trays and packing beds, and is enriched or added to by material which condenses into it out of the vapor stream. Still referring to FIG. 1, the exchange column 10 is diagrammatically cut in half for purposes of clarity. In this illustration, the column 10 includes a vapor outlet in overhead line 26 disposed atop the tower 12 and a lower skirt 28 disposed in the lower region of the tower 12 around bottom stream takeoff line 30 coupled to a reboiler (not shown). Reboiler return conduit 32 is shown disposed above the skirt 28 for recycling vapor therein upwardly through the trays and/or packing layers 14. Reflux from condensers is provided in the upper tower region 23 through reflux return line 34 wherein reflux is distributed throughout a liquid distributor 36 across upper packing bed 38. It may be seen that the upper packing bed 38 is of the structured packing variety. The regions of the exchange column 10 beneath the upper packing bed 38 are shown for the purpose of illustration and include a liquid collector 40 disposed beneath a support grid 41 in support of the upper structured packing bed 38. A liquid distributor 42, adapted for redistributing liquid 13, is likewise disposed therebeneath. A second type of distributor 42a is shown below the cut-line 43 and disposed above structured packing 14A. The column 10 is presented with cut-line 43 for illustrating the fact that the tower internals arrangement is diagrammatical only and is provided for referencing various component arrays therein.

Referring still to FIG. 1, both structured packing and tower trays are shown in this view for purposes of illustration. In many instances, process columns contain only packing, only trays, or selective combinations of packing and trays. The present illustration is a combination thereof for purposes of discussion of the overall tower and its operation. Process column trays generally comprise plates which are perforated or slotted in construction. The vapor and the liquid engage at or along the tray and, in some assemblies, are permitted to flow through the same openings in a counter-current flow arrangement. Optimally, the vapor and liquid flows reach a level of stability. In some embodiments no downcomers are used and the vapor and the liquid use the same openings, alternating as the respective pressures change. But such is not the case herein.

In the present embodiment of the invention, multi-downcomer trays 48 and 49 having multiple downcomers are illustrated. This is by way of example only in that the present invention addresses an active support ring and associated structure therefor as described herein. Multiple downcomers will be referred to although single downcomers may be used with such trays embodying the present invention. Tray 48, as shown, thus incorporates an active surface between multiple downcomers. The type of surface will be discussed below. Likewise, tray 49 includes an active surface between downcomers and active inlet areas disposed beneath the multiple downcomers thereabove. A more complete description of this section of the tower, which comprises the present invention, will be set forth below. The anatomy of process columns in general is likewise described in more detail in an article by Gilbert Chen, entitled "Packed Column Internals" appearing in the Mar. 5, 1984 edition of *Chemical Engineering,* incorporated herein by reference.

Figure 2:
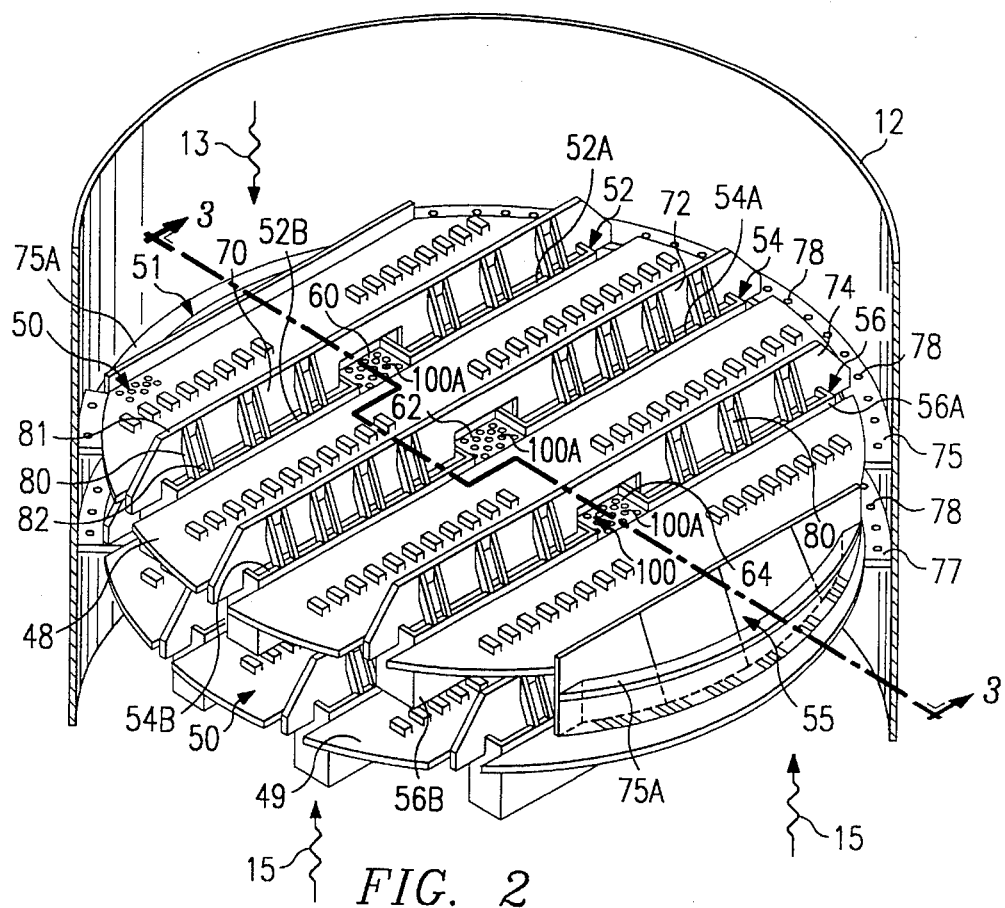
FIG. 2 is a perspective view of a downcomer-tray assembly constructed in accordance with the principles of the present invention.

Referring now to FIG. 2, there is shown an enlarged perspective view of the trays 48 and 49 schematically shown in FIG. 1. The remaining portions of the column are not shown for purposes of clarity. Upper tray 48 is constructed with an active tray surface 50 that has been separated by two side downcomers 51 and 55 and three intermediate downcomer arrays 52, 54, and 56. The side downcomers 51 and 55 will be discussed below. Each downcomer array 52, 54, 56 is made up of a pair of downcomers positioned in spaced end to end relationship. Downcomer array 52 thus comprises downcomer 52A in spaced end to end relationship with downcomer 52B. Downcomer array 54, likewise, is comprised of downcomer 54A in spaced end to end relationship with downcomer 54B. Downcomer array 56 is comprised of downcomer 56A disposed in an ended relationship with downcomer 56B. The spaced end to end relationship between said downcomers permits an active bridge to be placed therebetween. Downcomer array 52 thus includes active bridge 60 while downcomer array 54 includes bridge 62. A bridge 64 is disposed in downcomer array 56. In this manner, liquid along any portion of the tray 48 will be allowed to equalize across the tray surface by the presence of the bridges 60, 62 and 64.

As referenced above, the upper tray 48 is constructed with active tray surface 50 (partially and diagrammatically shown). The active surface 50 may be formed with one or more of a variety of valve types. Representative valve types for such applications are set forth and shown in U.S. Pat. No. 5,120,474, assigned to the assignee of the present invention and incorporated herein by reference.

Referring still to FIG. 2 the present invention further includes, in addition to the active support ring described below, for the outward support of process column trays, an improved support system for intermediate support of said trays incorporating baffles. A support baffle 70 is thus shown to extend the length of downcomer array 52 while support baffle 72 extends the length of downcomer array 54. Support baffle 74 extends the length of downcomer array 56 in support of the downcomer tray region therebeneath. Each of the support baffles 70, 72, and 74 is connected at opposite ends to the tower 12 and then connected to the respective downcomer-tray region by a plurality of support members 80 which are connected at a first end 81 to the support baffle and at a second end 82 to the downcomer tray region. This construction provides improved flow efficiency as is set forth in more detail in co-pending patent application Ser. No. 08/414,615 filed concurrently herewith, assigned to the assignee of the present invention and incorporated herein by reference.

Referring still to FIG. 2 tray 49 is constructed as described above with the downcomer arrays thereof disposed beneath the active tray areas 50 of tray 48. As will be described in more detail below, the active areas beneath the downcomers of the present invention may include a raised active inlet area for enhancing the vapor liquid contact therein. As shown in FIG. 2, the downcomers of tray 49 are disposed in generally parallel spaced relationship relative to the downcomers of tray 48 as well as being laterally offset therebetween.

Figure 3:
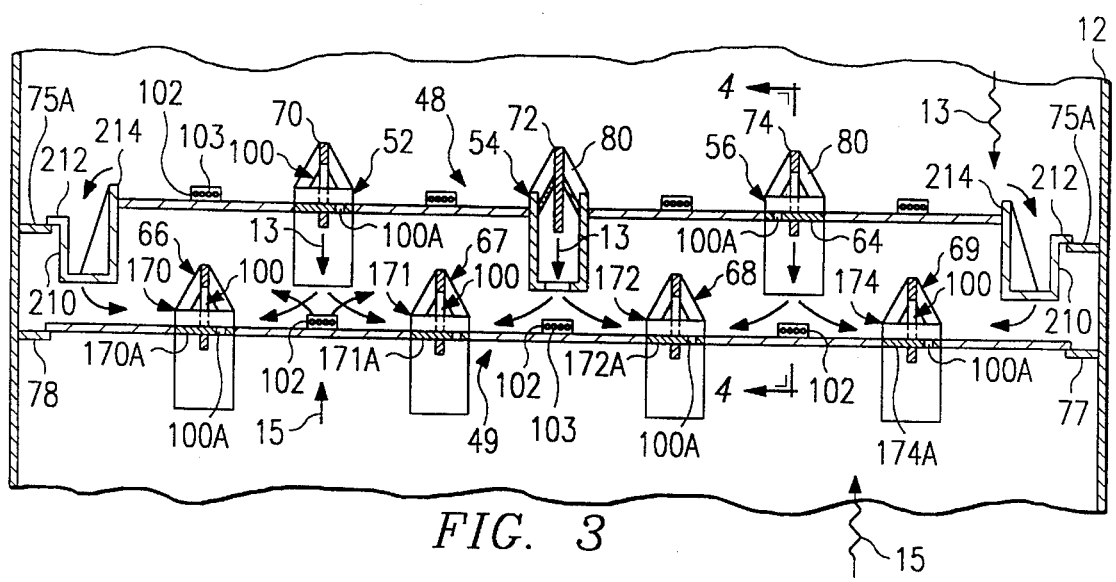
FIG. 3 is a diagrammatic, cross-sectional view of the improved downcomer tray assembly of FIG. 2, taken along lines 3—3 thereof.

Referring now to FIG. 3, there is shown a side-elevational, cross-sectional, diagrammatic view of several aspects of the present invention. As shown herein, liquid flows downwardly from first tray 48 over weirs 214 through side downcomers 51 and 55 and through first intermediate downcomers-arrays 52, 54 and 56 onto second tray 49 adjacent a second series of intermediate downcomer-arrays 66, 67, 68, and 69. Said downcomer-arrays of tray 49 are preferably constructed in similar fashion to the downcomer-arrays of tray 48 as described above. The first and second downcomer-arrays are oriented generally parallel one to the other and a plurality thereof are supported by the baffle support structure described above extending therealong. In that regard, baffles 170, 171, 172 and 174 of tray 49 are connected to the underlying downcomer-tray region through the plurality of angulated support members 80, which are described above. Each member 80 is secured at top end 81 to the respective baffle and at the second, opposite end 82 to the respective tray-downcomer region. The trays 48 and 49 are further supported along their outer perimeter by tower support rings 75 and 77 extending circumferentially therearound. The rings 75 and 77 preferably have formed therein apertures 78 for facilitating the ascending flow of vapor 15 therethrough. The apertures 78 formed in the support rings 75 and 77 comprise, in one embodiment, valves disposed therein for facilitating the flow of vapor 15 therethrough for increasing the effective active area 50 of the tray. A solid support ring 75A is provided for the side downcomers 51 and 55.

Referring still to FIG. 3, the diagrammatic schematic representation of the multiple downcomer tray assembly shown therein illustrates methods of, and apparatus for, maximizing structural and functional aspects of the process tower assembly. The material and techniques for the fabrication of such elements as described herein are well known of within the industry. Actual steel sizes are thus not set forth in that the gauge of the steel will depend upon the size of the tower 12.

The description of the present invention includes certain features which are only partially shown in FIG. 3, and which are described in more detail below. These features include the flow equalization bridges 60, 62, and 64 disposed across those downcomer arrays 52, 54, and 56 (described above) which are positioned in intermediate areas of the tray 48. The side downcomers 51 and 55 do not require this feature. The intermediate downcomer-arrays 66, 67, 68 and 69 of tray 49 are thus diagrammatically shown with bridge sections 170A, 171A, 172A and 174A, respectively, formed therein. Said bridge sections are formed across said respective downcomer-arrays through an opening 100 of the respective supporting baffle. Opening 100 may be seen more clearly in the perspective view FIG. 2. By providing an opening 100 through the respective baffle, liquid 13 flowing upon the trays 48 and 49 may flow therethrough while maintaining the structural integrity of the tray system. As described above, with regard to tray 48, the bridges 170A, 171A, 172A and 174A are each formed with a plurality of apertures 100A therein for facilitating the ascending flow of vapor 15 therethrough and to further increase the active region of the respective tray. The apertures 100A are also best seen in the perspective view of FIG. 2.

Still referring to FIG. 3, the trays 48 and 49 may also be constructed with raised active inlet areas disposed beneath the downcomer of the above tray. The raised active inlet areas in the present embodiment include portions of the respective tray floor which are raised into venting chambers 102 having apertures 103 formed in the side walls thereof for providing a means for direct passage of vapor 15 ascending through the tower 12. The methods of and apparatus for the utilization of the vapor venting chambers 102 as shown herein is more fully set forth and described in U.S. Patent application Ser. No. 08/306,672, assigned to the Assignee of the present invention and incorporated herein in its entirety, by reference. By utilizing the vapor venting chambers 102, the liquid 13 descending downwardly from the respective downcomers is met immediately with ascending vapor 15 passing through the apertures 103 of chambers 102. As shown by the flow arrows of FIG. 3 disposed beneath downcomer 52, the present invention provides direct interaction between the counter current flows of vapor and liquid within the tower 12 while maximizing the flow efficiency thereof.

Figure 4:
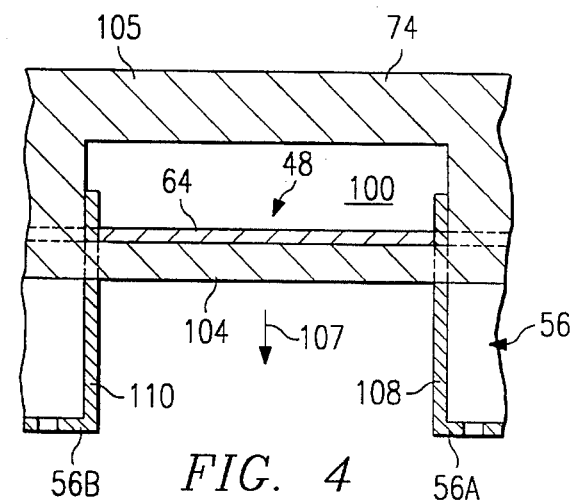
FIG. 4 is an enlarged, side elevational view of the downcomer of FIG. 3 taken along lines 4—4 thereof.

Referring now to FIG. 4 there is shown an enlarged, fragmentary side elevational, cross sectional view of a portion of the downcomer/support baffle of tray 48 of FIG. 3 taken along lines 4—4 thereof. Opening 100 is clearly shown disposed above the bridge section 64 of tray 48 forming a generally rectangular window through support baffle 74 of downcomer-array 56. The size of opening 100 leaves "in tact" elongate lower section 104 of support baffle 74. Structurally, this window configuration results in the lower section 104 providing structural integrity being in tension while upper section 105 is in compression from a mechanical loading standpoint. Loading is schematically represented by arrow 107 representing the weight of the tray, downcomers and liquid present thereon during the operation of the tower 12. With such loading, it is preferable to provide support for the bridge 64 of tray 48 by the lower section 104. It is for this reason that the opening 100 is not simply a U-shaped cutout formed within the baffle 74. However, because of the structural configuration shown, the baffle 74 extends through the end walls 108 and 110 of end-to-end downcomers 56A and 56B, respectively, of downcomer-array 56. Standard fabrication and field assembly techniques such as welding and the like are utilized to secure the downcomer and support baffle configurations.

Figure 5:
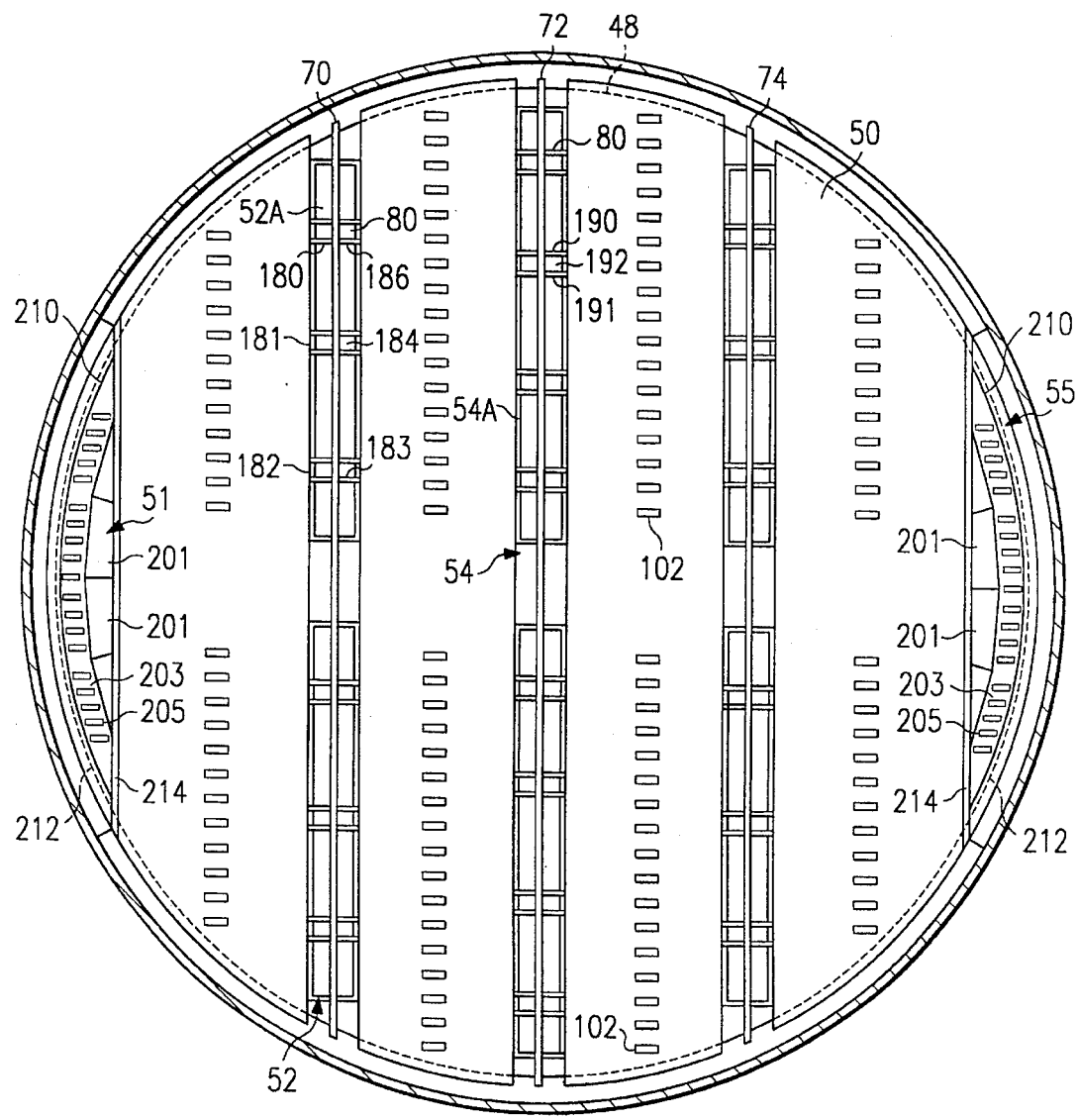
FIG. 5 is an enlarged top plan view of the downcomer-tray assembly of FIG. 2.

Referring now to FIG. 5 there is shown a top plan view of the tray 48 of FIG. 2 including the active tray section 50 and another illustration of the support baffles 70, 72, and 74. Each of said support baffles is connected by a series of connection members 80 to the respective downcomer-tray region therebeneath. The support baffle 70, for example, is constructed with six angulated connection members 180, 181, 182, 183, 184, and 186 connected to downcomer 52A of downcomer-array 52. Although six connection members 80 are shown for this particular section of the tray 48, the number will vary depending on the area of said tray and the structural loading for a particular tower. For example, baffle 72 of downcomer 54A of downcomer-array 54 is constructed with eight connection members 80 due to the wider expanse thereof compared to downcomer 52A.

Referring still to FIG. 5 the raised active inlet areas (vapor venting chambers 102) between the downcomers are clearly shown. It is in this region that the downcomer from the tray above would be positioned to discharge liquid onto the active area 50 of tray 48. The connection members 80 are also constructed to address such liquid flow issues. It may be seen that each of the connection members 80 is formed with side walls 190 and 191 upstanding from an intermediate web region 192. It is the web region 192 that provides an angulated baffle for liquid which may otherwise splash into the respective downcomers. The connection members 80 are thus preferably formed of generally U-shaped channel members as shown in FIG. 2.

Referring still to FIG. 5 the end downcomers 51 and 55 are more clearly shown at least partially. Each end downcomer 51 and 55 is constructed with flat, angulated side wall sections 201 which terminate in a flat bottom section 203. The bottom 203 is constructed with a plurality apertures 205 selectively arranged to distribute the liquid downwardly in a controlled configuration. This particular downcomer configuration is more clearly set forth and shown in U.S. Pat. No. 5,164,125, assigned to the Assignee of the present invention and incorporated herein by reference. What is not shown in the aforesaid referenced patent is the outside wall supporting configuration of the downcomers 51 and 55 as shown herein. Referring back to FIG. 3, and addressing same in combination with FIG. 5, it may be seen that the outside walls 210 of said downcomers are constructed with an upper lip support flange 212 which extends outwardly therefrom in overlapping engagement with the support ring 75. The support flange 212 is also stepped downwardly (as seen in FIG. 3) from the level of the tray 48. This stepped or "funnel" region allows liquid flow over the top of the weirs 214 into an area larger than the cross sectional width of the respective downcomer. It is in this manner that the side downcomers 51 and 55 can accommodate more liquid flow by preventing choking which may occur without the enlarged or "funnel" effect of the present invention.

Figure 6:
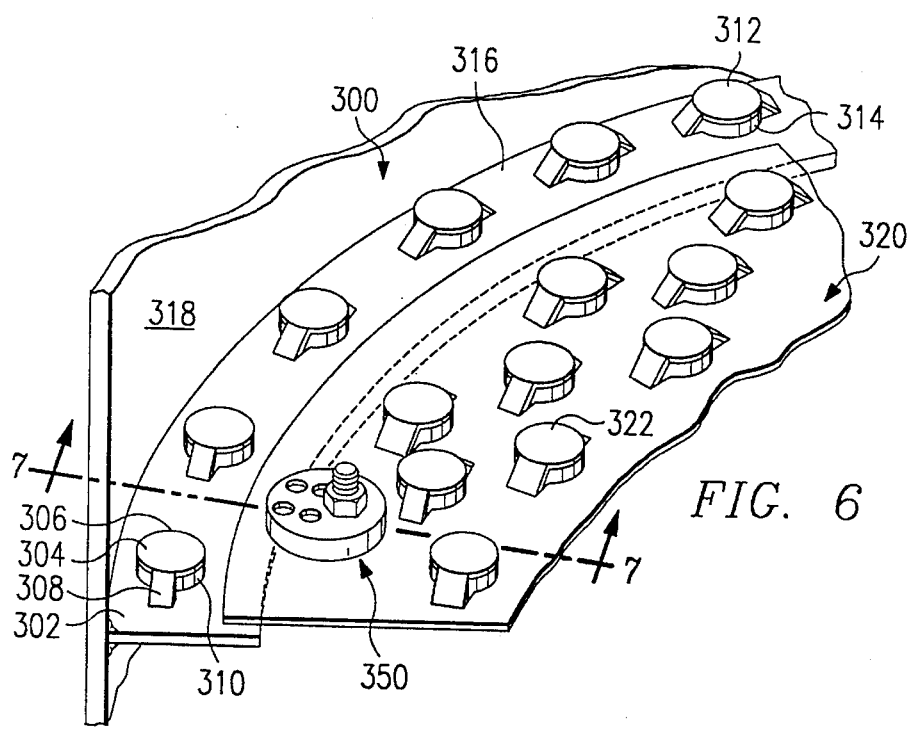
FIG. 6 is an enlarged, fragmentary, perspective view of the active tray support ring of FIG. 2.

Referring now to FIG. 6 there is shown a fragmentary perspective view of one embodiment of the active support ring in the present invention. Active support ring assembly 300 comprises a support ring 302 having a plurality of valves 304 formed therein. The support ring valves 304 may be of the "fixed" variety, incorporating a top valve member 306 fixedly secured by legs 308 above an aperture 310. For purposes of example a "floating" type valve may also be used, above an aperture 314 which valve types are more clearly described in U.S. Pat. No. 5,120,474 described above.

Still referring to FIG. 6, the support ring 302 is shown in this particular embodiment to be constructed from a flat plate 316 secured to the outer column wall 318. An active tray surface 320 is shown mounted to ring 302 with an active washer 350 (described below). Valves 322 are formed in tray surface 320. As described above, the active support ring 300 creates an increase in the effective active area of the associated tray 320. In this particular embodiment, the valves 304 are identical to the valves 322 of the tray 320. Variations in the valve configurations may also be used, and, in certain instances, a floating valve may be incorporated in either or both of the tray and support ring.

Figure 7:
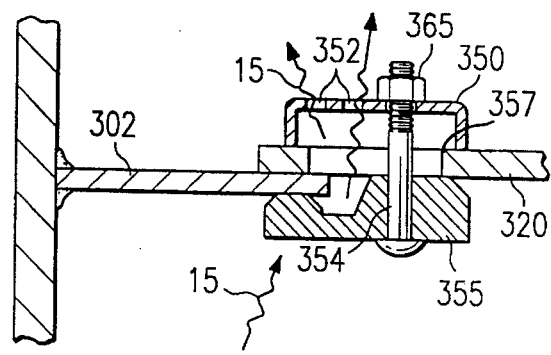
FIG. 7 is an enlarged, side elevational, cross sectional view of the support ring mounting of FIG. 6, taken along lines 7—7 thereof.

Referring now to FIG. 7 there is shown a side elevational, cross-sectional view of the securement of the tray 320 to the support ring 302 by the utilization of an active washer 350. The washer 350, as shown, is constructed in a hollow, or cup shape with apertures 352 formed therein to permit the ascending flow of vapor therethrough. It may be constructed as a rectangle or any other shape necessitated by the tray design. In this particular embodiment a securing member 354 is shown upstanding through the washer 350 and through clamp 355 secured beneath the support ring 302. A slot 357 is formed in the tray 320 to accommodate washer 350 and the vapor flow therethrough. Vapor flow 15 is thus allowed to pass through the support ring 302 as well as around and through said tray through the active washer 350 mounted thereover.

Figure 8:
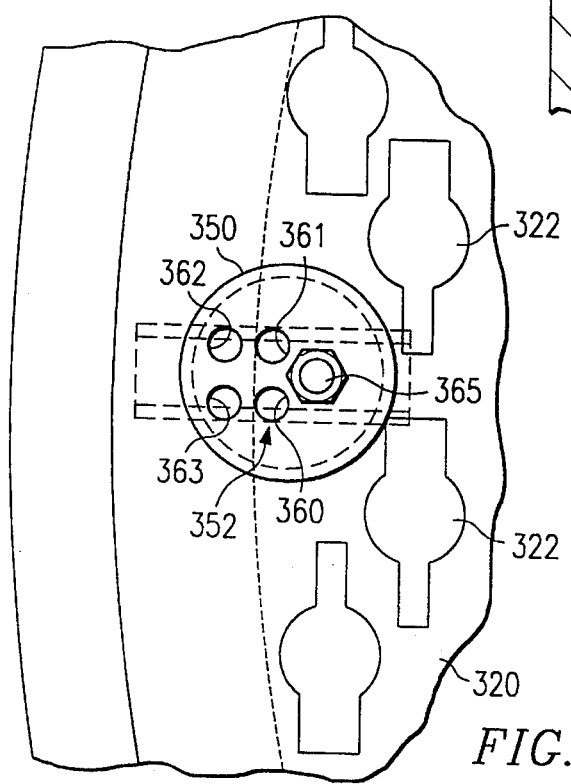
FIG. 8 is an enlarged, top plan view of the active washer of FIG. 7.

Referring now to FIG. 8 there is shown an enlarged, top plan view of the washer 350 of FIG. 7. The washer 350 is shown to be constructed with a number of apertures 352 to facilitate the flow of vapor therethrough. In this particular embodiment, venting apertures 360, 361, 362 and 363 are shown adjacent to mounting aperture that is adapted for the receipt of securing member 365 of FIG. 7. As discussed above, slots 322 are formed within the trays 320 to permit the ascending flow of vapor therethrough.

Referring now to FIGS. 6, 7, and 8 in combination, the utilization of the active support ring 300 and active washer 350 permit a tray construction commensurate with maximum efficiency in a process column operation. Vapor 15 ascending through the column is permitted to pass through peripheral portions of the tower not conventionally available for vapor flow. Liquid will, of course, flow across solid as well as perforated areas of a surface, and without the active region shown, the available vapor liquid interface is reduced. For this reason, the methods and apparatus of the present invention facilitate improved process tower operation.

Figure 9:
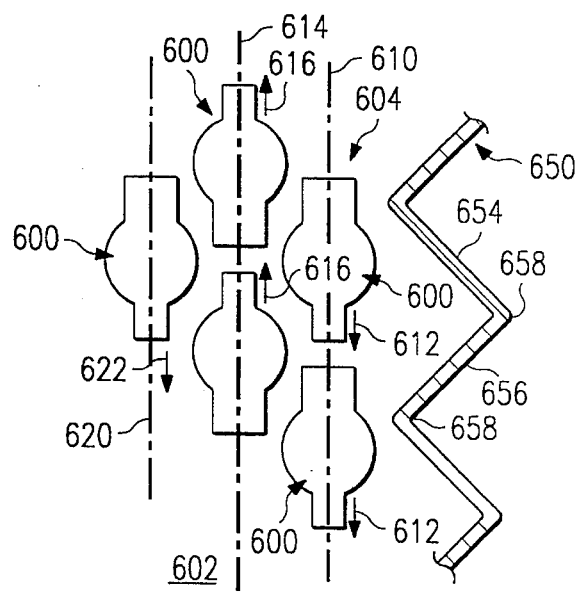
FIG. 9 is a top plan view of an alternative embodiment of a portion of the tray of FIG. 2.

Referring now to FIG. 9 there is shown an enlarged top plan view of an alternative embodiment of a portion of the active area of the tray of FIG. 2. In this particular view, it may be seen that the present invention comprises a directional flow valve array disposed within the active area of the tray deck in a select orientation. The flow valves 600 are of the directional flow variety and are disposed in the active area 602 of tray deck 604 in a pattern calculated to cause increased liquid turbulence and mixing along the tray surface area. Each of the valves 600 along a first phantom line 610 are positioned to discharge vapor in a direction represented by arrows 612 while the valves along phantom line 614 are oriented to discharge more vapor in the direction of arrows 616. Valves 600 of phantom line 620 discharge more vapor in the direction of arrows 622. Each of the valves are constructed to discharge vapor in both directions but with one direction being preferential and resulting in greater vapor flow therein. Such valves are often referred to as directional flow valves. By orienting the valves as herein described, the liquid flowing thereover will have imparted thereto thrust component perpendicular to the normal liquid flow thereby causing it to turn and twist in its movement from the downcomer discharge area to the particular downcomer weir adjacent thereto. This step increases the distance, or length of flow of the fluid traveling thereover. With the utilization of multiple downcomers in a single tray, the space between adjacent downcomers will be reduced. With reduced spacing, less "direct" travel distance is available for the liquid flow between the inlet area and the egressing downcomer weir. For this reason, increasing the length of flow over the active area is a distinct advantage which the present invention affords.

Still referring to FIG. 9, a weir 650 is shown adjacent valves 600 and constructed in a zig-zag configuration. The zig-zag configuration of the weir 650 is formed of a plurality of weir sections 654 and 656 forming apexes 658 therebetween. This zig-zag configuration increases the length of the weir relative to the active area 602. One parameter of flow distribution and tower efficiency includes the relationship between weir lengths and other parameters of the tray. By varying the weir shape, adjustments in length may be easily afforded without substantial modifications to the tray or downcomer area. This aspect of an adjustable weir length is likewise an asset when utilizing multiple downcomers within a single tray due to the fact that the downcomers may be disposed in side or chordal regions of the tray where the differences between the linear openings adjacent opposing downcomers can be substantial. In such configurations it is an advantage to be able to generally equalize the weir length in conjunction with the other vapor and liquid flow considerations to maximize tower efficiency and balance flow parameters therein in accordance with established vapor liquid contact tower operating procedures. The present invention provides such an advantage as herein set forth. In particular with the combination of the adjustable weir length and transverse directional flow valves with the oppositely oriented pattern above described, the efficiency of operation of the active area of the tray is greatly increased.

It is thus believed that the operation and construction of the present invention will be apparent from the foregoing description. While the method and apparatus shown or described has been characterized as being preferred it will be obvious that various changes and modifications may be made therein without departing from the spirit and scope of the invention as defined in the following claims.

We claim:

1. A downcomer-tray assembly for a vapor-liquid contact chemical process column of the type wherein said trays are formed with active regions thereon for the ascending flow of vapor therethrough and wherein liquid is directed to flow upon a first tray and downwardly therefrom through a first series of downcomers disposed therein onto a second tray and across active regions thereof between individual ones of a second series of downcomers disposed therein, said assembly further comprising:

means associated with said downcomer tray assembly and said column for the support of intermediate portions of said downcomer-tray assembly therein; and a tower support ring extending circumferentially around said downcomer-tray assembly and having formed therein apertures for facilitating the ascending flow of vapor therethrough.

2. The apparatus as set forth in claim 1 wherein said downcomer-tray assembly intermediate support includes at least one support baffle extending along said downcomer.

3. The apparatus as set forth in claim 1 wherein said apertures formed in said support ring comprise valves disposed therein for facilitating the flow of vapor therethrough.

4. The apparatus as set forth in claim 3 wherein said valves are of the fixed variety having a valve member supported above said aperture by a plurality of legs extending downwardly therefrom in secured engagement therewith.

5. The apparatus as set forth in claim 3 wherein said valves are of the floating variety.

6. The apparatus as set forth in claim 1 and further including an active washer and wherein said tray is secured to said active support ring by said active washer comprising a securing member having a plurality of apertures formed therethrough for facilitating the flow of vapor therein whereby vapor disposed beneath a tray may flow through said washers for further increasing the active region of said tray.

7. The apparatus as set forth in claim 6 wherein said active washer further includes a cup shaped member having a plurality of apertures formed therethrough, select ones of said apertures being aligned for threaded mounting with said active support ring.

8. The apparatus as set forth in claim 1 wherein some of the said regions of said second tray disposed beneath said first series of downcomers of said first tray are constructed with vapor riser chambers therein to facilitate the ascending flow of vapor therethrough.

9. The apparatus as set forth in claim 1 wherein said first and second series of downcomers are oriented generally parallel one to the other.

10. In a chemical process column of the type wherein liquid flows downwardly and vapor ascends upwardly through mixing regions thereof, a downcomer-tray assembly comprising:

a first tray formed with active regions thereon for the ascending flow of vapor therethrough and having at least one downcomer disposed therein;

a second tray having active regions thereon and disposed beneath said first tray and having at least a second downcomer disposed therein;

means associated with said column and extending across at least one of said first and second trays in support of intermediate portions thereof;

means for supporting the perimeter of said trays relative to said support means; and said perimeter support comprising a ring secured to said column circumferentially around said tray and having formed therein apertures for facilitating the ascending flow of vapor therethrough.

11. The apparatus as set forth in claim 10 wherein said apertures formed in said ring comprise valves disposed therein for facilitating the flow of vapor therethrough.

12. The apparatus as set forth in claim 11 wherein said valves are of the fixed variety having a valve member supported above said aperture by a plurality of legs extending downwardly therefrom in secured engagement therewith.

13. The apparatus as set forth in claim 11 wherein said valves are of the floating variety.

14. The apparatus as set forth in claim 10 and further including an active washer and wherein said tray is secured to said active support ring by said active washer comprising a securing member having a plurality of apertures formed therethrough for facilitating the flow of vapor therein whereby vapor disposed beneath a tray may flow through said washers for further increasing the active region of said tray.

15. The apparatus as set forth in claim 14 wherein said active washer further includes a cup shaped member having a plurality of apertures formed therethrough, select ones of said apertures being aligned for threaded mounting with said support ring.

16. The apparatus as set forth in claim 10 wherein at least two downcomers are disposed in said first tray in spaced, end to end relationship and wherein an active tray bridge is disposed between said ends of said end to end downcomers for permitting liquid flow thereacross.

17. The apparatus as set forth in claim 16 wherein said intermediate tray support comprises a single support baffle extending continuously along said end to end downcomers in support thereof, said baffle including an open, intermediate region thereof adapted for receiving said bridge therethrough and facilitating liquid flow thereacross for equalization of liquid flow upon said tray adjacent thereto.

18. The apparatus as set forth in claim 17 wherein said active regions of said trays are formed with vapor valves therein for facilitating the ascending flow of vapor therethrough.

19. The apparatus as set forth in claim 18 wherein said said vapor valves comprise fixed valves.

20. The apparatus as set forth in claim 18 wherein said vapor valves comprise floating valves.

21. The apparatus as set forth in claim 18 wherein said bridge is formed with a plurality of vapor valves therein for facilitating the ascending flow of vapor therethrough and to further increase the active region of said tray.

22. The apparatus as set forth in claim 10 wherein some of said regions of said second tray disposed beneath said first series of downcomers of said first tray are constructed with vapor riser chambers therein to facilitate the ascending flow of vapor therethrough.

23. The apparatus as set forth in claim 10, wherein said active area of said tray comprises directional flow valves disposed thereon.

24. The apparatus as set forth in claim 23, wherein said directional flow valves are disposed in aligned rows which are configured to discharge vapor in a direction generally transverse to the liquid flow thereacross.

25. The apparatus as set forth in claim 24, wherein adjacent rows of said valves discharge said vapor in opposite directions to create turbulence therebetween and enhance the tray efficiency thereof.

26. The apparatus as set forth in claim 23, wherein said valves are of the fixed variety having a first leg wider than a second leg for creating a preferential vapor distribution therefrom.

* * * * *